NICHOLS & CLARK.
Subsoil-Plow.
No. 69.117.
Patented Sept. 24, 1867.
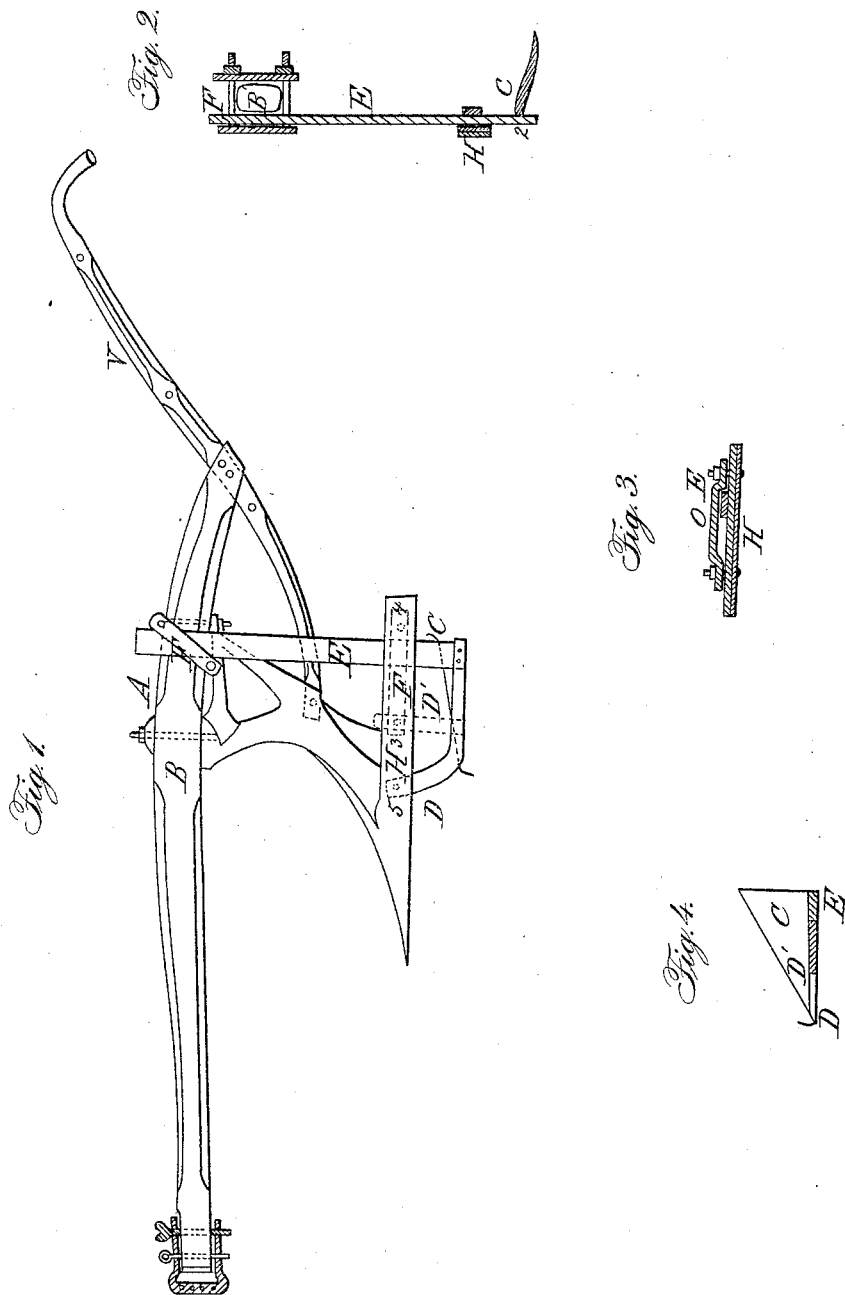
Witnesses:
D. P. Fuller
U. J. Van Hooten
Inventor:
William L. Nichols

United States Patent Office.

WILLIAM D. NICHOLS AND NELSON W. CLARK, OF CHICAGO, ILLINOIS.

*Letters Patent No. 69,117, dated September 24, 1867.*

IMPROVEMENT IN PLOUGHS.

*The Schedule referred to in these Letters Patent and making part of the same.*

TO ALL WHOM IT MAY CONCERN:

Be it known that we, WILLIAM D. NICHOLS and NELSON W. CLARK, of Chicago, Cook county, State of Illinois, have invented an improved Subsoil Plough-Attachment; and do hereby declare that the following is a full and exact description thereof, reference being had to the accompanying drawing, making part of this specification.

A is a plough, B the beam, V the handles thereof. C is the subsoil plough, with the upright standard E, by which it is attached firmly to the beam by the clasp F and to the inside of the land-side by the strap O. The coulter D connects the point of the subsoil plough to the land-side, and is bolted thereto by the bolt 5. This coulter adds great strength to the subsoil plough, and should it come in contact with a stone, it is thrown out without damage.

This coulter may be attached to the subsoil plough back of the point 1, when desired. The bolts 5, 3, and 4, through the land-side of the plough, are sufficient to attach the coulter D and the strap O thereto. This forms a very simple, cheap, and efficient attachment.

The subsoil plough enters the ground at 1, and rises gradually to 2, at the rear of the plough, which loosens the ground sufficiently.

What we claim by our invention, and desire to secure by Letters Patent, is—

1. Attaching the subsoil plough C to the land-side and beam of a plough, as described.
2. The coulter D, as described.

WILLIAM D. NICHOLS,
NELSON W. CLARK.

Witnesses:
    HENRY E. NICHOLS,
    S. C. SHOTWELL.